Aug. 10, 1965 W. H. CILKER 3,200,023
METHOD OF MAKING A REINFORCED PLASTIC PIPE FITTING
Filed May 9, 1961
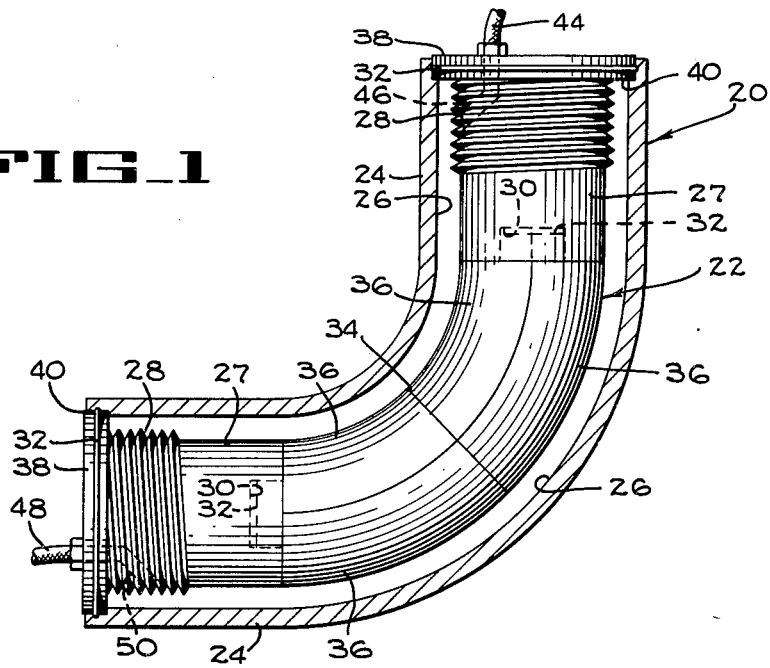
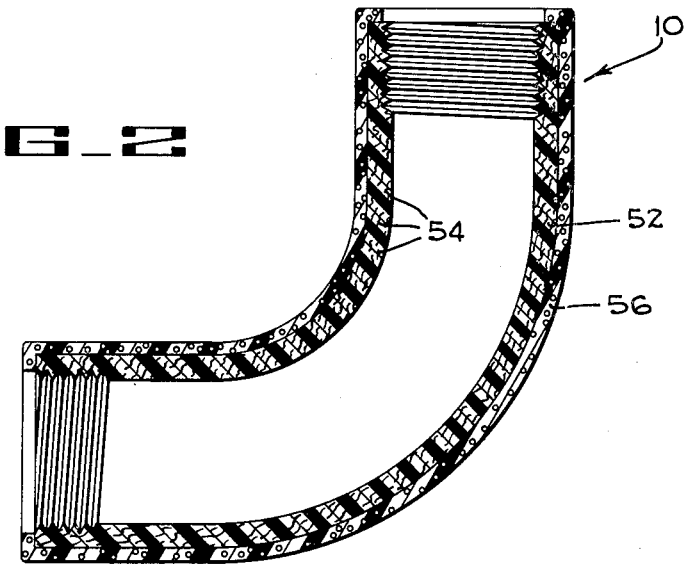
INVENTOR
WILLIAM H. CILKER
BY Hans F. Hoffmeister
ATTORNEY 3,200,023
METHOD OF MAKING A REINFORCED PLASTIC PIPE FITTING
William H. Cilker, Los Gatos, Calif., assignor to FMC Corporation, a corporation of Delaware
Filed May 9, 1961, Ser. No. 108,847
1 Claim. (Cl. 156—172)

The present invention pertains to plastic products and more particularly relates to reinforced plastic pipe fittings intended for use at relatively high pressure or vacuum.

The usual plastic and fiber reinforced pipe fitting is formed by first wrapping a woven material, that has been saturated with a resin binder, onto a molding form which can be removed from the fitting after the resin is cured. Although this type of fitting usually has several overlays of resin-coated reinforcing fibers, minute voids inevitably exist in the woven material body and these voids permit fluid to escape through the fitting when it is put in use. If the fitting is pressurized during the molding process, the number of voids is reduced to an insignificant amount. However, there has heretofore been no convenient way of accomplishing pressure molding of plastic pipe fittings without using an elaborate and relatively expensive expansible inner mold, or a contractible outer mold.

In the present invention an improved and completely fluid-tight pipe fitting is produced under pressure in a novel pipe fitting manufacturing process, the fitting being especially adapted for use with reinforced plastic pipe and capable of inexpensive and rapid manufacture.

Accordingly, one of the objects of the present invention is to provide an improved pressure molded plastic pipe fitting which is completely fluid tight.

Another object of this invention is the provision of an improved molding process for producing a plastic pipe fitting which will not permit leakage of the fluid handled thereby.

Another object is the provision of a rapid and inexpensive process for manufacturing void-free reinforced plastic fittings for pipe.

A further object of this invention is to provide a pressure molding process for producing pipe fittings wherein no expanding or contracting molding elements are required.

These, and other objects and advantages of the present invention, will become apparent from the following description and the accompanying drawing, in which:

FIGURE 1 is a medial section taken through a typical mold which can be used in carrying out the novel process of the present invention in order to produce a leak proof plastic pipe fitting constructed in accordance with that process.

FIGURE 2 is a medial section taken through a pipe elbow constructed in accordance with the present invention.

Any of a variety of molding means may be used in the practice of the pipe fitting manufacturing process of the present invention. As an example, which is in no way to be construed as limiting the process thereto, the pipe fitting 10 (FIG. 2) may be produced in a mold 20 of the type shown in FIGURE 1.

As is well known in the molding or casting arts, the type of mold indicated at 20, FIGURE 1, may comprise a sectional core 22 which is rigidly held within a separable shell 24 so as to form an annular passage 26 therebetween which has the desired configuration of a pipe fitting body. The core 22 may include unitary end pieces 27, each of which is provided at one end with external threads 28 and at the other end with a cylindrical end socket 30. Each unitary end piece 27 is rotatable upon a complementary projecting portion 32 which is formed on the adjacent end of the central part 34 of the core 22. In order to facilitate its subsequent removal from a finished pipe fitting, the central part 34 of the core comprises a plurality of complementary sections 36 which are fitted with mating parts, not shown, permitting their disassembly without special tools.

The spaced relation of the core 22 and shell 24, respectively, is maintained by closure caps 38. One closure cap 38 is secured to each unitary end 27 of the core 22, and in the assembled mold 20, is engaged with a shoulder provided by an end recess 40 which is formed in the separable outer shell 24. A hexagon socket or other similar means, not shown, is provided in the outer face of each closure cap 38 for engagement with a tool for turning the unitary end 27 when the mold 20 is disassembled.

Each closure cap 38 is provided with a peripheral sealing ring 32. When the core 22 and the shell 24 are assembled and ready for the injection of a plastic material into the annular passage 26, the sealing rings 32 provide a fluid-tight seal between the core and shell.

A plastic material, which will be presently described, is introduced under pressure to the passage 26 through a conduit 44 which communicates with a passage 46 that extends into the passage 26 through one of the end closure caps 38 and the associated core section 27.

A similar conduit 48 and a passage 50 are provided in the other end closure cap 38 so that if the plastic is forced into the annular passage under a positive pressure, the entrapped air within the mold 20 may escape. Conversely, if the plastic is introduced at a negative pressure, a vacuum is drawn by means of the conduit 48 in order to evacuate the passage 26.

Whether the passage 26 is filled by either negative or positive pressure means, the plastic material employed is subjected to a compressive force due to the pressure differential between inlet and outlet conduits 44 and 48, respectively, sufficient to force out air entrapped therein. In order to assure that the passage 26 contains only the plastic and is completely free of cavities in or around the plastic before the outlet is closed, the outlet conduit may remain open until a predetermined volume of the plastic material is removed from the mold. The outlet can then be closed to subject the plastic mass to the pressure within the mold in order to compact it into a dense mass to form a pipe fitting body 52 (FIG. 2).

The plastic material, forming the body of the fitting which is cast in the passage 26, may be an uncured plastic thermosetting resin of the epoxy group including silicones, phenolics, polyesters and the like, in which are mixed random length, unoriented, reinforcing fibers 54 of organic or inorganic composition. Preferably, the fibers are chopped glass filaments since these combine the desirable features of great strength, light weight and efficient bonding. The plastic material, of course, is not limited to thermosetting resins, as thermoplastic cold setting resins will work equally well. Since the resin is utilized in its liquid state, it will be easily understood that the mold passage 26 is rapidly and completely filled, whereas in the usual process the resin-soaked woven mat comprising the fitting body impedes the flow of resin in the mold and makes it extremely difficult to fill all of the numerous spaces between the woven fibers.

Even when the usual woven fiber mat type of fitting body is compressed, there inevitably exist visually undetectable, very small voids which cause the loss of fluid through the fitting walls when the fitting is placed in service. Also, as previously mentioned, the compression of the usual fitting requires a more complicated mold because one or the other of the mold elements must be movable toward the other to effect compression of the fitting body.

In accordance with the present invention, after the material has been compacted in the mold, a curing stage occurs in which, when using thermosetting resin, the resin is partially hardened to a gelled condition wherein it will be firm enough so that the outer shell 24 of the mold 20 may be separated and removed from the fitting body 52 without incurring any damage or malformation of the fitting. The curing time is dependent upon the type of resin used, the curing being carried out until the partially hardened fitting body can be separated from the shell 24. In this manner, a more perfect bond can be obtained between the body 52 (FIG. 2) and a reinforcing overlay 56 of resin impregnated fibers which is next applied.

At the appropriate time when the fitting body 52 is gelled to the desired firmness, as must be determined by experimentation controlled as to time, temperature and other factors related to the type of resin used, the body of the fitting, with the core 22 still in position therein, is circumferentially wrapped with one or more layers of the resin wetted fibers forming the reinforcing layer 56. The desired firmness of the fitting body is reached when the body will retain its shape upon the core after the shell 24 is removed. At this time the resin body will be soft enough for the reinforcing fibers to become slightly embedded in the fitting body and irremovably locked thereto after curing of the resin, by reason of their resin coatings being in intimate bonding contact with the body. After wrapping, the composite pipe fitting is cured until the wrapping is hardened sufficiently for the fitting to be handled without damage.

The reinforcing layer is preferably formed of continuous glass filament roving, because, as is well known in the reinforced plastic art, articles thus reinforced attain very high strength and yet are extremely light and compact. In fittings designed for use in lower pressure service, the reinforcing strands might be formed of one or more of the many available synthetic and natural fibers. In any case, the particular details of application of the roving layer form no part of the present invention but are included as illustrative of one manner of carrying out the process of this invention.

The unitary end pieces 27 of the core 22 are unscrewed from the pipe fitting body 10 after the reinforcing layer 56 has cured. The core sections 36 are then driven out of the fitting and the fitting may be placed in service.

The above-described process produces a light weight plastic and fiber pipe fitting 10 which is completely fluid-tight, even at extremes of either negative or positive operating pressures possesses an extremely smooth flow passage, and may be very rapidly and inexpensively manufactured.

While a particular embodiment of the present invention has been shown and described it will be understood that the article, as well as the process of this invention is capable of modification and variation without departing from the principles of the invention and that the scope of the invention should be limited only by the scope and proper interpretation of the claim appended hereto.

The invention having thus been described, that which is believed to be new, and for which protection by Letters Patent is desired, is:

The method of producing a reinforced plastic pipe fitting completely free of voids comprising the steps of mixing radom length glass reinforcing fibers in random orientation with uncured resin in a liquid state; injecting the resulting liquid mixture into a substantially closed mold under a pressure sufficient to eliminate substantially all voids to form a pipe fitting body having the desired wall thickness, flow passage and connecting means; curing the body to a gelled condition; impregnating a continuous fiber strand with resin; wrapping the strand circumferentially around the gelled body to dispose the strand in intimate contact with the body and cause resin on the strand to combine with the resin of said body, and completing the curing of the wrapped fitting body to consolidate the reinforcing fibers and the body.

References Cited by the Examiner

UNITED STATES PATENTS

| | | | |
|---|---|---|---|
| 2,082,611 | 6/37 | Benge. | |
| 2,370,193 | 2/45 | Reid | 285—55 |
| 2,480,702 | 9/49 | Billmeyer | 156—171 |
| 2,614,058 | 10/52 | Francis | 156—171 |
| 2,703,109 | 3/55 | Saville | 285—55 |
| 2,870,486 | 1/59 | Wagner et al. | |
| 2,877,501 | 3/59 | Gradt. | |
| 2,878,038 | 3/59 | Noland | 156—172 XR |
| 3,012,922 | 12/61 | Wiltshire. | |
| 3,082,134 | 3/63 | Wentz | 156—173 XR |

EARL M. BERGERT, *Primary Examiner.*